(12) United States Patent
Bang (10) Patent No.: US 12,351,172 B2
(45) Date of Patent: Jul. 8, 2025

(54) APPARATUS AND METHOD FOR CONTROLLING DISTANCE FROM A FRONT VEHICLE

(71) Applicants: HYUNDAI MOTOR COMPANY, Seoul (KR); Kia Corporation, Seoul (KR)

(72) Inventor: Kyung Joo Bang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 479 days.

(21) Appl. No.: 17/665,916

(22) Filed: Feb. 7, 2022

(65) Prior Publication Data

US 2023/0018012 A1    Jan. 19, 2023

(30) Foreign Application Priority Data

Jul. 16, 2021    (KR) .......................... 10-2021-0093814

(51) Int. Cl.
*B60W 30/16* (2020.01)

(52) U.S. Cl.
CPC .......... *B60W 30/16* (2013.01); *B60W 2520/10* (2013.01); *B60W 2554/4041* (2020.02); *B60W 2554/4042* (2020.02); *B60W 2554/802* (2020.02); *B60W 2720/106* (2013.01)

(58) Field of Classification Search
CPC ............. B60W 30/16; B60W 2520/10; B60W 2554/4041; B60W 2554/4042; B60W 2554/802; B60W 2720/106; B60W 2050/0022; B60W 2520/04; B60W 2530/18; B60W 2754/30; B60W 40/105; B60W 40/107; B60W 30/181; B60W 60/001

See application file for complete search history.

(56) References Cited

U.S. PATENT DOCUMENTS

| | | | |
|---|---|---|---|
| 5,495,251 A | 2/1996 | Gilling et al. | |
| 8,660,767 B2 | 2/2014 | Nakai et al. | |
| 8,983,751 B2 | 3/2015 | Ham | |
| 2003/0217880 A1* | 11/2003 | Isogai | B60W 30/16 |
| | | | 180/170 |
| 2013/0317719 A1 | 11/2013 | Ham | |
| 2015/0307103 A1* | 10/2015 | Kuroki | B60T 13/52 |
| | | | 701/70 |
| 2017/0341612 A1* | 11/2017 | Ohmori | B60W 50/10 |

(Continued)

FOREIGN PATENT DOCUMENTS

| | | |
|---|---|---|
| EP | 0 612 641 B1 | 5/1997 |
| JP | H09-323566 A | 12/1997 |

(Continued)

*Primary Examiner* — Ashley L Redhead, Jr.
(74) *Attorney, Agent, or Firm* — MORGAN, LEWIS & BOCKIUS LLP (57) ABSTRACT

An apparatus for controlling a distance from a front vehicle includes a receiver to receive information on a host vehicle and information on the front vehicle, an acceleration generator to generate one of first acceleration for the host vehicle or second acceleration for the host vehicle, based on the received information on the host vehicle and the received information on the front vehicle and an output device to output the generated first acceleration or the generated second acceleration.

14 Claims, 4 Drawing Sheets

(56) References Cited

U.S. PATENT DOCUMENTS

| | | | | |
|---|---|---|---|---|
| 2018/0208195 | A1* | 7/2018 | Hutcheson | G08G 1/162 |
| 2018/0366005 | A1* | 12/2018 | Seenumani | B61L 15/0018 |
| 2020/0310454 | A1* | 10/2020 | Oguro | G05D 1/0274 |

FOREIGN PATENT DOCUMENTS

| | | | |
|---|---|---|---|
| JP | 2006-264571 | A | 10/2006 |
| JP | 2007-314179 | A | 12/2007 |
| KR | 10-1376209 | B1 | 3/2014 |
| KR | 10-1953904 | B1 | 3/2019 |

* cited by examiner

APPARATUS AND METHOD FOR CONTROLLING DISTANCE FROM A FRONT VEHICLE

CROSS-REFERENCE TO RELATED APPLICATION

This application is based on and claims the benefit of priority to Korean Patent Application No. 10-2021-0093814, filed on Jul. 16, 2021, in the Korean Intellectual Property Office, the disclosure of which is incorporated herein in its entirety by reference.

TECHNICAL FIELD

The present disclosure relates to an apparatus and a method for controlling a distance from a front vehicle.

BACKGROUND

In general, to constantly control the distance from a vehicle (front vehicle) in front, the traveling circumstance of the front vehicle or a host vehicle has to be considered. When the acceleration of the host vehicle is controlled through a one-sided approach without considering the traveling circumstance of the front vehicle or the host vehicle, the safety distance from the front vehicle is not guaranteed.

When the distance from the front vehicle is constantly controlled based on the traveling circumstances, a target safety distance, which is to be constantly maintained, may be varied depending on the driving speed of the host vehicle. However, when the acceleration of the host vehicle is controlled through a conventional manner, even though the front vehicle is stopped, acceleration control based on a distance error is more dominant than acceleration control based on a speed error, so the control over a vehicle may be weakened.

SUMMARY

The present disclosure addresses the above-mentioned problems occurring in the prior art while maintaining advantages achieved by the prior art.

An aspect of the present disclosure provides an apparatus and a method for controlling acceleration of a host vehicle, based on a traveling condition, when maintaining a distance between vehicles.

Another aspect of the present disclosure provides an apparatus and a method for controlling acceleration of a host vehicle through mutually different manners with respect to a front vehicle stopped and a front vehicle traveling, when maintaining a distance between vehicles.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a distance from a front vehicle may include a receiver to receive information on a host vehicle and information on the front vehicle, an acceleration generator to generate one of first acceleration for the host vehicle or second acceleration for the host vehicle, based on the received information on the host vehicle and the received information on the front vehicle, and an output device to output the generated first acceleration or the generated second acceleration.

In addition, according to some embodiments, the apparatus for controlling a distance from a front vehicle may further include a controller to control the host vehicle based on the outputted first acceleration or the outputted second acceleration.

In addition, according to some embodiments, the information on the host vehicle may include a speed of the host vehicle, and the information on the front vehicle may include a speed of the front vehicle and a separation distance between the host vehicle and the front vehicle.

In addition, according to some embodiments, the acceleration generator may generate: (i) the first acceleration when the speed of the front vehicle is not zero, and (ii) the second acceleration when the speed of the front vehicle is zero.

Further, according to some embodiments, the first acceleration may represent acceleration for maintaining a first distance between the host vehicle and the front vehicle, and the second acceleration may represent acceleration for maintaining a second distance between the host vehicle and the front vehicle.

In addition, according to some embodiments, the first distance may be adaptively varied depending on the speed of the host vehicle, and the second distance may have a constant value.

In addition, according to some embodiments, the first acceleration may be generated based on the speed of the front vehicle, the speed of the host vehicle, the separation distance, the first distance, a speed weight, and a distance weight. The second acceleration may be generated based on the speed of the host vehicle, the separation distance, and the second distance.

In addition, according to some embodiments, the second acceleration may have a constant value, and may represent a gradient of a linear function having, as parameters, the speed of the host vehicle and a time taken until the host vehicle is stopped.

In addition, according to some embodiments, the time taken until the host vehicle is stopped may correspond to twice of a result value obtained by dividing a moving distance of the host vehicle until the host vehicle is stopped, by the speed of the host vehicle, and the moving distance may represent a difference between the separation distance and the second distance.

In addition, according to some embodiments, a speed error value may represent a difference between the speed of the front vehicle and the speed of the host vehicle, and a distance error value may represent a distance between the separation distance and the first distance. The first acceleration may be generated based on a result value obtained by multiplying the speed error value by the speed weight, and a result value obtained by multiplying the distance error value by the distance weight.

Further, according to another aspect of the present disclosure, a method for controlling a distance from a front vehicle may include receiving, by a receiver, information on a host vehicle and information on the front vehicle, generating, by an acceleration generator, one of first acceleration for the host vehicle or second acceleration for the host vehicle, based on the received information on the host vehicle and the received information on the front vehicle, and outputting, by an output device, the generated first acceleration or the generated second acceleration.

In addition, according to some embodiments, the method for controlling, by a controller, a distance from a front vehicle may further include controlling the host vehicle based on the outputted first acceleration or the outputted second acceleration.

In addition, according to some embodiments, the information on the host vehicle may include a speed of the host vehicle, and the information on the front vehicle may include a speed of the front vehicle and a separation distance between the host vehicle and the front vehicle.

Further, according to some embodiments, the generating of one of the first acceleration for the host vehicle and the second acceleration for the host vehicle may include: (i) generating the first acceleration when the speed of the front vehicle is not zero, and (ii) generating the second acceleration when the speed of the front vehicle is zero.

Further, according to some embodiments, the first acceleration may represent acceleration for maintaining a first distance between the host vehicle and the front vehicle, and the second acceleration may represent acceleration for maintaining a second distance between the host vehicle and the front vehicle.

In addition, according to some embodiments, the first distance may be adaptively varied depending on the speed of the host vehicle, and the second distance may have a constant value.

In addition, according to some embodiments, the first acceleration may be generated based on the speed of the front vehicle, the speed of the host vehicle, the separation distance, the first distance, a speed weight, and a distance weight. The second acceleration may be generated based on the speed of the host vehicle, the separation distance, and the second distance.

In addition, according to some embodiments, the second acceleration may have a constant value, and may represent a gradient of a linear function having, as parameters, the speed of the host vehicle and a time taken until the host vehicle is stopped.

In addition, according to some embodiments, the time taken until the host vehicle is stopped may correspond to twice of a result value obtained by dividing a moving distance of the host vehicle until the host vehicle is stopped, by the speed of the host vehicle, and the moving distance may represent a difference between the separation distance and the second distance.

In addition, according to some embodiments, a speed error value may represent a difference between the speed of the front vehicle and the speed of the host vehicle, and a distance error value may represent a difference between the separation distance and the first distance. The first acceleration may be generated based on a result value obtained by multiplying the speed error value by the speed weight, and a result value obtained by multiplying the distance error value by the distance weight.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions may not be provided in order not to unnecessarily obscure the gist of the present disclosure.

In addition, in the following description of components according to an embodiment of the present disclosure, the terms 'first', 'second', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 4.

Figure 1:
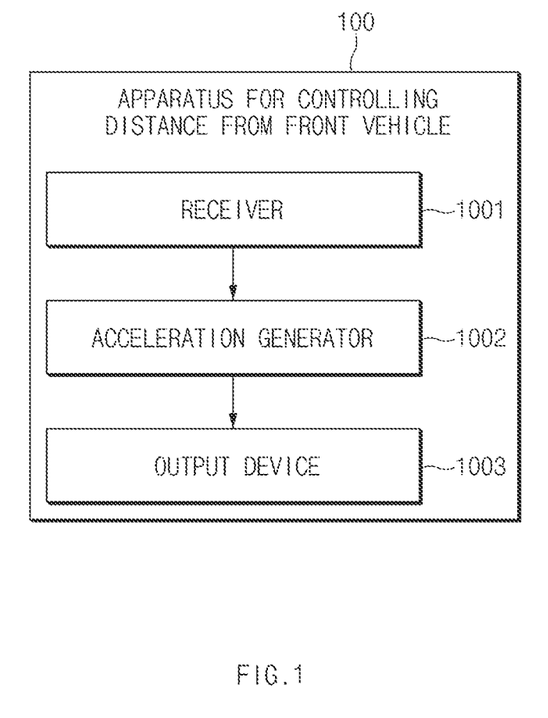
FIG. 1 is a block diagram showing an illustrative apparatus for controlling a distance from a front vehicle, according to some embodiments of the present disclosure.

FIG. 1 is a block diagram showing an illustrative apparatus for controlling a distance from a front vehicle, according to some embodiments of the present disclosure.

FIG. 1 is a block diagram illustrating an apparatus (or simply an "apparatus") 100 for controlling a distance from a front vehicle, according to some embodiments of the present disclosure.

According to some embodiments, a vehicle may include an autonomous driving vehicle. According to some embodiments, the autonomous driving vehicle may perform self-driving based on an autonomous driving system. According to some embodiments, the vehicle may constantly maintain the distance from a front vehicle positioned in a traveling direction, during traveling. Accordingly, the vehicle may control the acceleration of the vehicle to constantly maintain the distance from the front vehicle. According to some embodiments, the vehicle may be referred to as a host vehicle.

According to some embodiments, the apparatus for controlling the distance from the front vehicle may include a receiver 1001, an acceleration generator 1002, and/or an output device 1003. According to some embodiments, the apparatus may be provided included inside or outside the host vehicle described above. According to some embodiments, the apparatus may include one or more elements not illustrated in this drawings.

According to some embodiments, the receiver 1001 may receive information on the host vehicle and information on the front vehicle. According to some embodiments, the information on the host vehicle may include a speed of the host vehicle. According to some embodiments, the information on the front vehicle may include a speed of the front vehicle and/a separation distance between the host vehicle and the front vehicle. According to some embodiments, the receiver 1001 may include at least one processor operated by a predetermined program, which is adapted to receive information on the host vehicle and information on the front vehicle. According to some embodiments, the information on the host vehicle and/or the information on the front vehicle may be acquired through a sensor (for example, a LiDAR sensor or a time of fight (TOF) sensor) included in the host vehicle. According to some embodiments, the receiver 1001 may be communicatively connected to the sensor.

According to some embodiments, the acceleration generator 1002 may generate one of first acceleration for the host vehicle and second acceleration for the host vehicle, based on the received information on the host vehicle and the received information on the front vehicle. According to some embodiments, the acceleration generator 1002 may include at least one processor operated by a predetermined program, which is adapted to generate one of first acceleration for the host vehicle and second acceleration for the host vehicle, based on the received information on the host vehicle and the received information on the front vehicle. According to some embodiments, the acceleration generator 1002 may be communicatively connected to the receiver 1001.

According to some embodiments, the first acceleration may be acceleration for constantly maintaining the distance from the front vehicle, to correspond to that the front vehicle is traveling. According to some embodiments, the second acceleration may be acceleration for stopping the host vehicle while maintaining a constant distance from the front vehicle, to correspond to that the front vehicle is stopped.

A distance constantly maintained from the front vehicle, which is traveling, and based on the first acceleration may be referred to as a first distance. A distance constantly maintained to the front vehicle, which is stopped, and based on the second acceleration may be referred to as a second distance. In other words, the first acceleration may represent acceleration for maintaining the first distance between the host vehicle and the front vehicle, and the second acceleration may represent acceleration for maintaining the second distance between the host vehicle and the front vehicle. According to some embodiments, the first distance and the second distance may be preset by a user or may be calculated by a system.

In other words, according to some embodiments, the apparatus may select and output a proper one of the first acceleration or the second acceleration depending on the traveling condition of the host vehicle and/or the front vehicle. According to some embodiments, the detailed description of the procedure of generating acceleration by the acceleration generator will be made below with reference to FIG. 2. According to some embodiments, the detailed description of the first acceleration and the second acceleration will be described below with reference to FIG. 3.

According to some embodiments, the output device 1003 may output the first acceleration or the second acceleration which is generated. According to some embodiments, the output device 1003 may include at least one processor operated by a predetermined program, which is adapted to output the generated first acceleration or the generated second acceleration. According to some embodiments, the output device 1003 may be communicatively connected to the acceleration generator 1002.

According to some embodiments, the apparatus 100 may further include a controller (not illustrated) to control the host vehicle, based on the first acceleration or the second acceleration which is output. In other words, the apparatus may control acceleration of the host vehicle, based on any one of the first acceleration or the second acceleration to control the distance from the front vehicle. According to some embodiments, the controller may include at least one processor operated by a predetermined program, which is adapted to control the host vehicle, based on the outputted first acceleration or the outputted second acceleration. According to some embodiments, the controller may be communicatively connected to the output device 1003.

According to some embodiments, the apparatus 100 may maintain a constant distance from the front vehicle by controlling the acceleration of the host vehicle through a method described with reference to the drawings. Further, according to some embodiments, the apparatus 100 may safely and effectively control the acceleration of the host vehicle by generating proper acceleration for the traveling condition of the host vehicle and/or the front vehicle.

Figure 2:
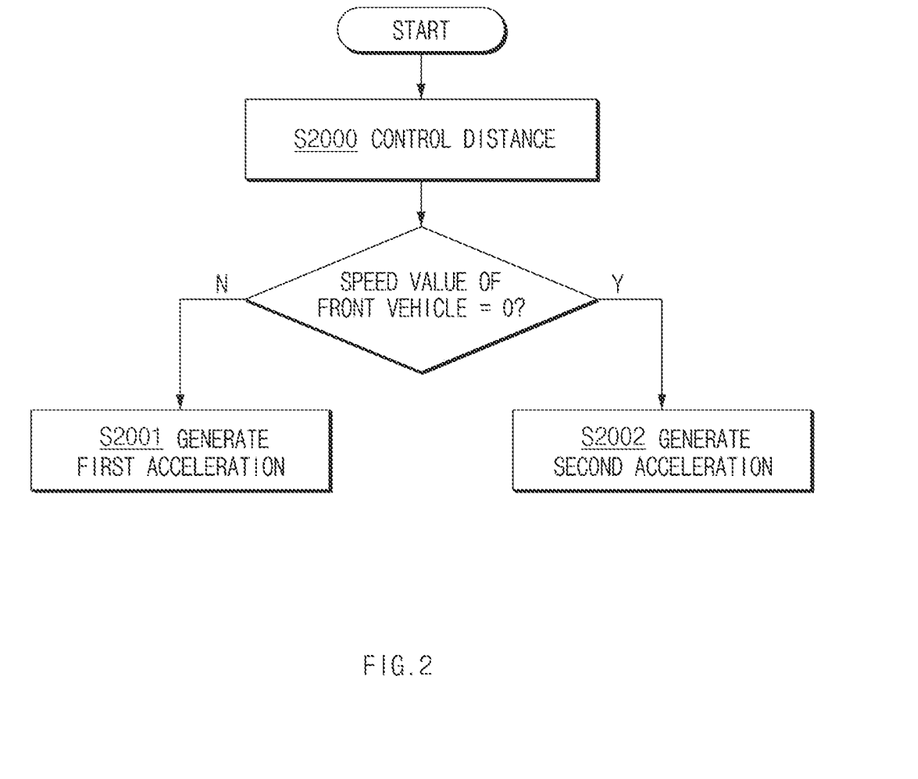
FIG. 2 illustrates the operation of an acceleration generator, according to some embodiments of the present disclosure.

FIG. 2 illustrates the operation of an acceleration generator, according to some embodiments of the present disclosure.

FIG. 2 is a flowchart illustrating the operation of generating acceleration by an acceleration generator (the acceleration generator 1002 described with reference to FIG. 1), according to some embodiments.

As described with reference to FIG. 1, the acceleration generator may generate one of first acceleration for the host vehicle and second acceleration for the host vehicle, based on the received information on the host vehicle and the received information on the front vehicle. According to some embodiments, the detailed description of the first acceleration and the second acceleration are identical to or similar to the description made with reference to FIG. 1.

As described with reference to FIG. 1, the acceleration generator may generate the acceleration based on the traveling condition of the host vehicle and/or the front vehicle.

According to some embodiments, the acceleration generator may operate, to correspond to the host vehicle controls a separation distance between vehicles (S2000). In other words, when the front vehicle is absent or when the host vehicle does not control the distance from the front vehicle, the acceleration generator may not operate.

According to some embodiments, the acceleration generator may generate acceleration, based on the speed of the front vehicle, which is included in information on the front vehicle.

According to some embodiments, the acceleration generator may generate the first acceleration when the speed of the front vehicle is not zero (S2001).

As described with reference to FIG. 1, according to some embodiments, the first acceleration may represent acceleration for maintaining the first distance between the host vehicle and the front vehicle which is traveling. In this case, since the front vehicle is traveling, the first distance may be adaptively varied based on the speed of the host vehicle, which is included in the information on the host vehicle. For example, the first distance is directly proportional to the speed of the host vehicle. Therefore, according to some embodiments, the first acceleration may have variable value, to correspond to the first distance adaptively varied.

According to some embodiments, the acceleration generator may generate the second acceleration when the speed of the front vehicle is zero (S2002).

As described with reference to FIG. 1, according to some embodiments, the second acceleration may represent acceleration for maintaining the second distance between the host vehicle and the front vehicle which is stopped. In this case, since the front vehicle is stopped, the second distance may have a constant value. For example, the second distance represents a safety distance from the front vehicle, which is stopped, such that the host vehicle is safely stopped. Therefore, according to some embodiments, the second acceleration may have a constant value.

According to some embodiments, the acceleration generator may transmit an acceleration, which is generated through the method described with reference to the drawings, to an output device (the output device 1003 described with reference to FIG. 1).

According to some embodiments, the apparatus 100 may maintain a constant distance from the front vehicle by controlling the acceleration of the host vehicle through a method described with reference to FIG. 2. Further, according to some embodiments, the apparatus 100 may safely and effectively control the acceleration of the host vehicle by generating proper acceleration for the traveling condition of the host vehicle and/or the front vehicle.

Figure 3:
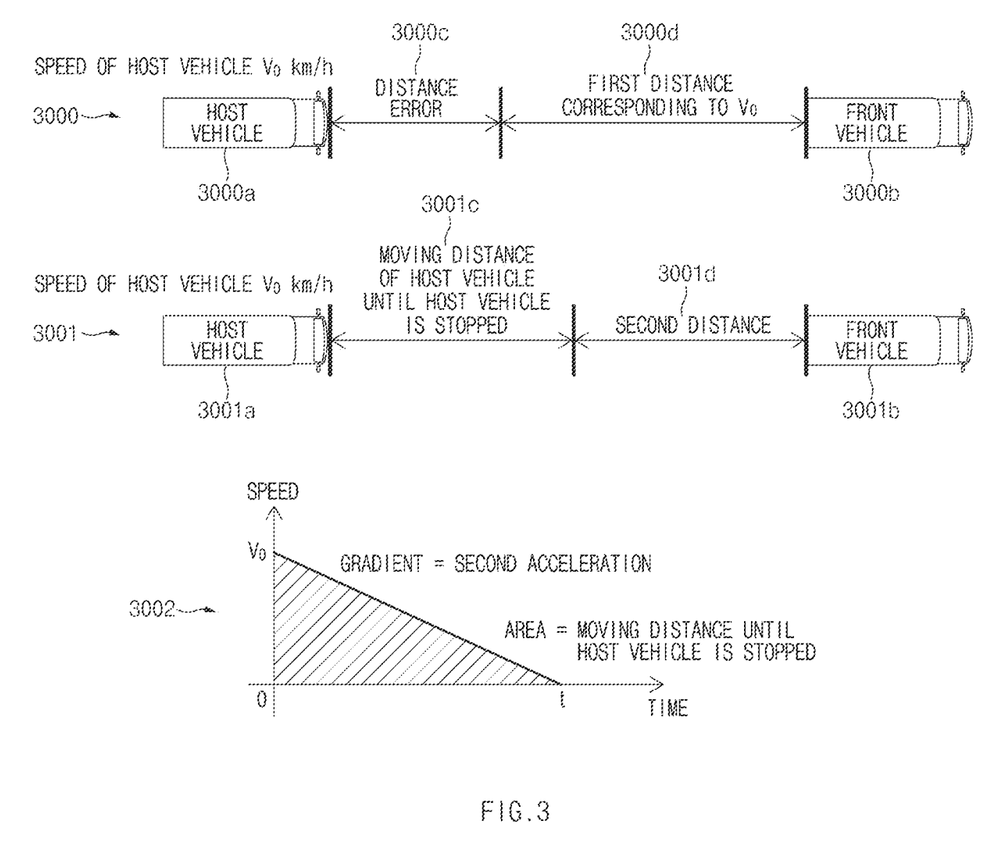
FIG. 3 illustrates a manner for calculating first acceleration and second acceleration, according to some embodiments of the present disclosure.

FIG. 3 illustrates a manner for calculating first acceleration and second acceleration, according to some embodiments of the present disclosure.

FIG. 3 is a view illustrating a manner for calculating first acceleration and second acceleration (the first acceleration and the second acceleration described with reference to FIGS. 1 to 2), according to some embodiments.

As described with reference to FIGS. 1 to 2, the first acceleration may represent acceleration generated to correspond to a front vehicle which is traveling, and the second acceleration may represent acceleration generated to correspond to a front vehicle which is stopped.

Reference numeral 3000 indicates a view illustrating a manner of calculating the first acceleration, according to some embodiments.

Reference numeral 3000a may indicate the host vehicle, according to some embodiments, and reference numeral 3000b may indicate the front vehicle, which is traveling, according to some embodiments.

According to some embodiments, the first acceleration may be generated, based on the speed of the front vehicle, the speed ($V_O$) of the host vehicle, the separation distance (see reference numerals 3000c and 3000d) between the host vehicle and the front vehicle, the first distance (see reference numeral 3000d), a speed weight and/or a distance weight. According to some embodiments, the descriptions of the speed of the front vehicle, the speed ($V_O$) of the host vehicle, the separation distance between the host vehicle and the front vehicle, and the first distance are identical to or similar to those described with reference to FIGS. 1 to 2. In other words, the first distance may be determined to correspond to the speed ($V_O$) of the host vehicle).

According to some embodiments, the speed weight may be a weight for a speed error value, and the distance weight may be a weight for a distance error value. According to some embodiments, the speed error value may represent the difference between the speed of the front vehicle and the speed of the host vehicle. For example, the speed error value may be a value obtained by subtracting the speed of the host vehicle from the speed of the front vehicle. According to some embodiments, the distance error value (see reference numeral 3000c) may represent the difference between the separation distance and the first distance. For example, the distance error value may be a value obtained by subtracting the first distance from the separation distance. The speed weight and the distance weight may be preset values or values calculated by the system.

According to some embodiments, the first acceleration may be calculated through following Equation 1.

$$A1 = (\text{gain}_{spd} * \text{Speed}_{Error}) + (\text{gain}_{dist} * \text{Distant}_{Error}) \qquad \text{Equation 8}$$

In Equation 1, "A1" may represent the first acceleration. "gain_spd" may represent the speed weight. "Speed_Error" may represent the speed error value. "Gain_dist" may represent the distance weight. "Distance_Error" may represent the distance error value. In other words, according to some embodiments, the first acceleration may be generated, based on a value obtained by multiplying the speed error value by the speed weight, and a value obtained by multiplying the distance error value by the distance weight.

When the method for generating the acceleration based on Equation 1 is identically applied even to the case of the front vehicle stopped, the host vehicle may break a preset safety distance (for example, the first distance or the second distance). For example, when the host vehicle travels at low speed at a long distance from the front vehicle stopped, a positive acceleration value from the distance error value becomes greater than a negative acceleration value from the speed error value. Accordingly, the host vehicle may not be controlled. In this case, the host vehicle fails to properly reduce the speed. Accordingly, the host vehicle may not be stopped at the target safety distance.

Therefore, according to some embodiments, the apparatus (for example, the acceleration generator) may generate the second acceleration through a manner different from the manner based on Equation 1, to correspond to the front vehicle stopped.

Reference numbers 3001 to 3002 are views illustrating the manner of generating the second acceleration, according to some embodiments.

Reference numeral 3001a may indicate the host vehicle, according to some embodiments, and reference numeral 3001b may indicate a front vehicle, which is stopped, according to some embodiments.

According to some embodiments, the second acceleration may be generated, based on the speed ($V_O$) of the host vehicle, the separation distance (see reference numerals 3001c and 3001d) between the host vehicle and the front vehicle, and/or the second distance (see reference numeral 3001d). According to some embodiments, the descriptions of the speed ($V_O$) of the host vehicle, the separation distance, and the second distance are identical to or similar to those described with reference to FIGS. 1 to 2. According to some embodiments, the moving distance of the host vehicle until the host vehicle is stopped may represent the difference between the separation distance and the second distance. According to some embodiments, the second distance may have a constant value regardless of the speed of the host vehicle.

Referring to reference numeral 3002, the second acceleration may represent a gradient of a linear function having, as parameters, the speed of the host vehicle and the time taken until the host vehicle is stopped. According to some embodiments, the time taken until the host vehicle is stopped may represent a value corresponding to twice of a value obtained by dividing the moving distance of the host vehicle until the host vehicle is stopped, by the speed of the host vehicle. According to some embodiments, the moving distance of the host vehicle until the host vehicle is stopped may correspond to an area formed by the linear function as illustrated in reference numeral 3002. In other words, the second acceleration may have a negative gradient of the linear function described above.

According to some embodiments, the second acceleration may be calculated based on following Equation 2.

$$A2 = \frac{V_o^2}{2(d0 - d1)} \quad \text{Equation 2}$$

In Equation 2, "A2" may represent the second acceleration. "$V_o$" may represent the speed of the host vehicle. "d0" may represent the separation distance. "D1" may represent the second distance.

In other words, the second acceleration is generated based on the second distance having the constant value. Accordingly, the second acceleration may have a constant value. Accordingly, according to some embodiments, the host vehicle may be stopped, based on the second acceleration, without breaking the second distance, to correspond to that the host vehicle travels toward the front vehicle which is stopped.

According to some embodiments, the apparatus may maintain a constant distance from the front vehicle by controlling the acceleration of the host vehicle through the manner described with reference to the drawings. Further, according to some embodiments, the apparatus may safely and effectively control the acceleration of the host vehicle by generating proper acceleration for the traveling condition of the host vehicle and/or the front vehicle.

Figure 4:
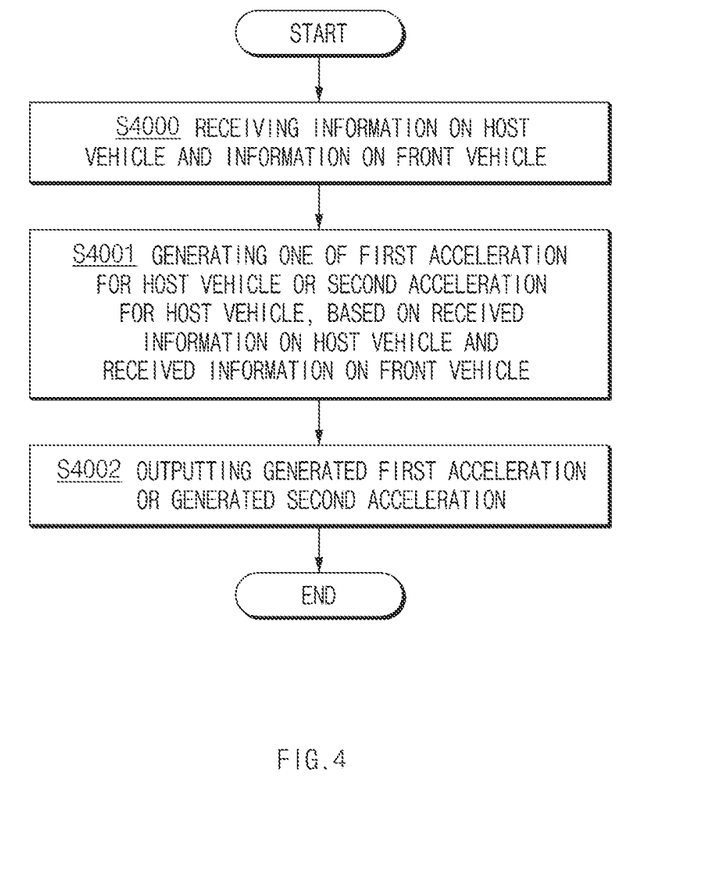
FIG. 4 illustrates a method for controlling a distance from a front vehicle, according to some embodiments of the present disclosure.

FIG. 4 illustrates a method for controlling a distance from a front vehicle, according to some embodiments of the present disclosure.

FIG. 4 is a flowchart illustrating a method (simply, a method) for controlling a distance from a front vehicle, according to some embodiments. The apparatus described with reference to FIGS. 1 to 3 will perform the method to be described with reference to FIG. 4.

According to some embodiments, the method may include receiving information on a host vehicle and information on the front vehicle (S4000), generating one of first acceleration for the host vehicle and second acceleration for the host vehicle, based on the received information on the host vehicle and the received information on the front vehicle (S4001), and/or outputting the generated first acceleration or the generated second acceleration (S4002). According to some embodiments, the method may include one or more steps not illustrated in this drawings.

The receiver described with reference to FIG. 1 may perform S4000. The acceleration generator described with reference to FIG. 1 may perform S4001. The output device described with reference to FIG. 1 may perform S4002.

According to some embodiments, the method may further include controlling the host vehicle, based on the first acceleration or the second acceleration which is output. The controller described with reference to FIG. 1 may perform the above step.

According to some embodiments, the information on the host vehicle may include a speed of the host vehicle, and the information on the front vehicle may include a speed of the front vehicle and a separation distance between the host vehicle and the front vehicle. According to some embodiments, the detailed descriptions of the information on the host vehicle and the information on the front vehicle are identical to or similar to those described with reference to FIGS. 1 to 3.

According to some embodiments, S4001 may include generating the first acceleration when the speed of the front vehicle is not zero, and generating the second acceleration when the speed of the front vehicle is zero. The description of the above step is identical to or similar to the description made with reference to FIG. 2.

According to some embodiments, the first acceleration may represent acceleration for maintaining the first distance between the host vehicle and the front vehicle. According to some embodiments, the second acceleration may represent acceleration for maintaining the second distance between the host vehicle and the front vehicle. The detailed description of the first acceleration, the second acceleration, the first distance, and the second distance is identical to or similar to the description made with reference to FIGS. 1 to 3.

According to some embodiments, the first distance may be adaptively varied depending on the speed of the host vehicle, and the second distance may have a constant value.

According to some embodiments, the first acceleration may be generated, based on the speed of the front vehicle, the speed of the host vehicle, the separation distance between the host vehicle and the front vehicle, the first distance, a speed weight and/or a distance weight. According to some embodiments, the second acceleration may be generated, based on the speed of the host vehicle, the separation distance between the host vehicle and the front vehicle, and/or the second distance. According to some embodiments, the detailed description of the method of generating the first acceleration and the second acceleration are identical to or similar to the description made with reference to FIG. 3.

Therefore, according to some embodiments, the second acceleration may have a constant value. According to some embodiments, the second acceleration may represent a gradient of a linear function having, as parameters, the speed of the host vehicle and a time taken until the host vehicle is stopped. The detailed description of the linear function is identical to or similar to the description made with reference to FIG. 3.

According to some embodiments, the time taken until the host vehicle is stopped may represent a value corresponding to twice of a value obtained by dividing the moving distance of the host vehicle until the host vehicle is stopped, by the speed of the host vehicle. According to some embodiments, the moving distance of the host vehicle until the host vehicle is stopped may represent the difference between the separation distance and the second distance. According to some embodiments, the detailed description of the time taken until the host vehicle is stopped and the moving distance of the host vehicle until the host vehicle is stopped are identical to or similar to the description made with reference to FIG. 3.

According to some embodiments, a speed error value may represent a difference between the speed of the front vehicle and the speed of the host vehicle, and a distance error value may represent a difference between the separation distance and the first distance. According to some embodiments, the detailed description of the speed error value and the distance error value are identical to or similar to the description made with reference to FIG. 3.

According to some embodiments, the first acceleration may be generated, based on a value obtained by multiplying the speed error value by the speed weight, and a value obtained by multiplying the distance error value by the distance weight. According to some embodiments, the detailed description of the method of generating the first acceleration is identical to or similar to the description made with reference to FIG. 3.

According to some embodiments, the apparatus may maintain a constant distance from the front vehicle by controlling the acceleration of the host vehicle through the method described with reference to the drawings. Further, according to some embodiments, the apparatus may safely and effectively control the acceleration of the host vehicle by generating proper acceleration for the traveling condition of the host vehicle and/or the front vehicle.

According to an embodiment, the acceleration of the host vehicle may be controlled by considering the traveling condition, when maintaining the distance between vehicles.

In addition, according to some embodiments, the acceleration of the host vehicle may be controlled through mutually difference manners with respect to the front vehicle stopped and the front vehicle traveling.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a distance from a front vehicle, the apparatus comprising:
    a memory; and
    a processor configured to:
        receive information on a host vehicle, wherein the information on the host vehicle includes a speed of the host vehicle, and information on the front vehicle, wherein the information on the front vehicle includes a speed of the front vehicle and a separation distance between the host vehicle and the front vehicle;
        generate, based on the received information on the host vehicle and the received information on the front vehicle, one of first acceleration for the host vehicle when the speed of the front vehicle is not zero, or second acceleration for the host vehicle-when the speed of the front vehicle is zero;
        output the generated first acceleration or the generated second acceleration; and
        control the host vehicle based on the output of the generated first acceleration or the generated second acceleration.

2. The apparatus of claim 1,
    wherein the first acceleration represents acceleration for maintaining a first distance between the host vehicle and the front vehicle, and
    wherein the second acceleration represents acceleration for maintaining a second distance between the host vehicle and the front vehicle.

3. The apparatus of claim 2, wherein the first distance is adaptively varied depending on the speed of the host vehicle, and
    wherein the second distance has a constant value.

4. The apparatus of claim 2,
    wherein the first acceleration is generated based on the speed of the front vehicle, the speed of the host vehicle, the separation distance, the first distance, a speed weight, and a distance weight, and
    wherein the second acceleration is generated based on the speed of the host vehicle, the separation distance, and the second distance.

5. The apparatus of claim 4, wherein the second acceleration has a constant value, and represents a gradient of a linear function having, as parameters, the speed of the host vehicle and a time taken until the host vehicle is stopped.

6. The apparatus of claim 5,
    wherein the time taken until the host vehicle is stopped corresponds to twice of a result value obtained by dividing a moving distance of the host vehicle until the host vehicle is stopped, by the speed of the host vehicle, and
    wherein the moving distance represents a difference between the separation distance and the second distance.

7. The apparatus of claim 4,
    wherein a speed error value represents a difference between the speed of the front vehicle and the speed of the host vehicle, and a distance error value represents a difference between the separation distance and the first distance, and
    wherein the first acceleration is generated based on a result value obtained by multiplying the speed error value by the speed weight, and a result value obtained by multiplying the distance error value by the distance weight.

8. A method for controlling a distance from a front vehicle, the method comprising:
    receiving, by a receiver, information on a host vehicle, wherein the information on the host vehicle includes a speed of the host vehicle, and information on the front vehicle, wherein the information on the front vehicle includes a speed of the front vehicle and a separation distance between the host vehicle and the front vehicle;
    generating, by an acceleration generator, based on the received information on the host vehicle and the received information on the front vehicle, one of first acceleration for the host vehicle when the speed of the front vehicle is not zero or second acceleration for the host vehicle when the speed of the front vehicle is zero;
    outputting, by an output device, the generated first acceleration or the generated second acceleration; and
    controlling, by a controller, the host vehicle based on the output of the generated first acceleration or the generated second acceleration.

9. The method of claim 8, wherein the first acceleration represents acceleration for maintaining a first distance between the host vehicle and the front vehicle, and
    wherein the second acceleration represents acceleration for maintaining a second distance between the host vehicle and the front vehicle.

10. The method of claim 9,
    wherein the first distance is adaptively varied depending on the speed of the host vehicle, and
    wherein the second distance has a constant value.

11. The method of claim 9,
    wherein the first acceleration is generated based on the speed of the front vehicle, the speed of the host vehicle, the separation distance, the first distance, a speed weight, and a distance weight, and wherein the second acceleration is generated based on the speed of the host vehicle, the separation distance, and the second distance.

12. The method of claim 11, wherein the second acceleration has a constant value, and represents a gradient of a linear function having, as parameters, the speed of the host vehicle and a time taken until the host vehicle is stopped.

13. The method of claim 12,
wherein the time taken until the host vehicle is stopped corresponds to twice of a result value obtained by dividing a moving distance of the host vehicle until the host vehicle is stopped, by the speed of the host vehicle, and
wherein the moving distance represents a difference between the separation distance and the second distance.

14. The method of claim 11, wherein a speed error value represents a difference between the speed of the front vehicle and the speed of the host vehicle, and a distance error value represents a difference between the separation distance and the first distance, and
wherein the first acceleration is generated based on a result value obtained by multiplying the speed error value by the speed weight, and a result value obtained by multiplying the distance error value by the distance weight.

* * * * *